Oct. 13, 1931.     C. E. STRYKER     1,826,965
ELECTRICAL SAFETY DEVICE
Filed April 9, 1927
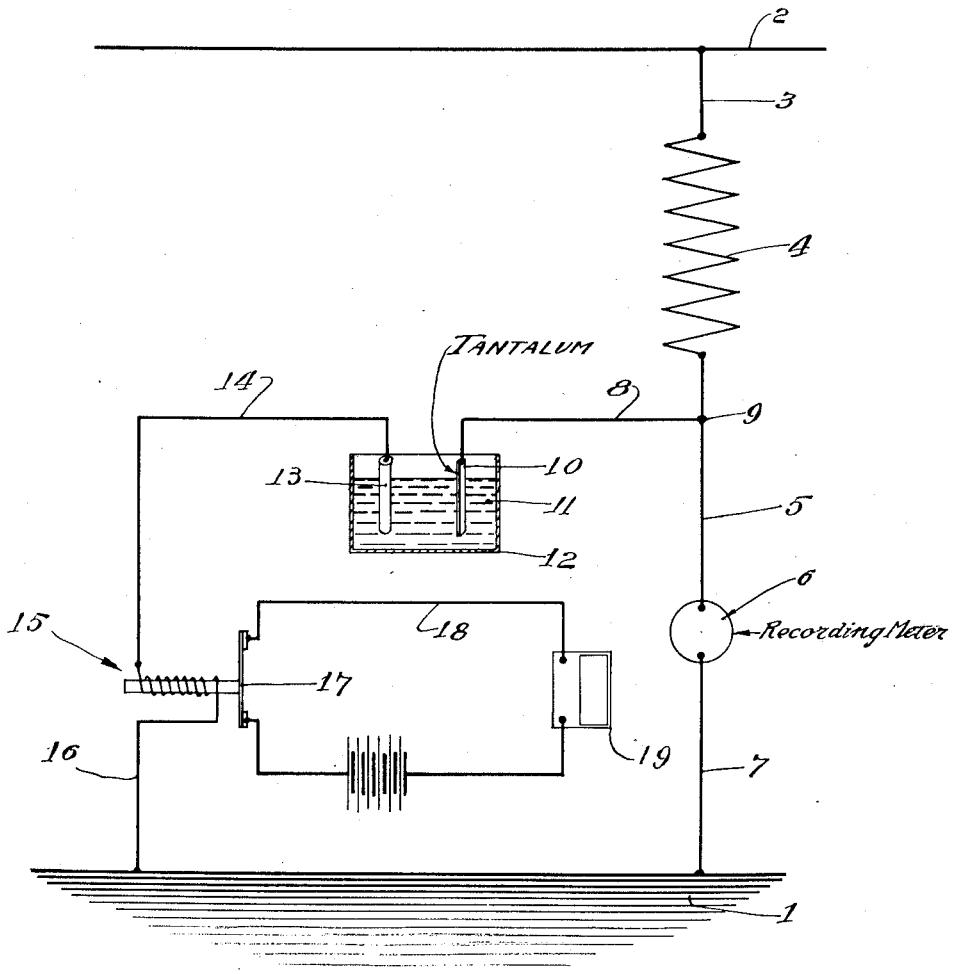
Inventor:
Clinton E. Stryker
By: Williams, Bradbury,
McCaleb & Hinkle
Atty's.

Patented Oct. 13, 1931

1,826,965

UNITED STATES PATENT OFFICE

CLINTON E. STRYKER, OF HIGHLAND PARK, ILLINOIS, ASSIGNOR TO FANSTEEL PRODUCTS COMPANY, OF NORTH CHICAGO, ILLINOIS, A CORPORATION OF NEW YORK

ELECTRICAL SAFETY DEVICE

Application filed April 9, 1927. Serial No. 182,244.

This invention relates to a safety device for protecting meters, or men operating or repairing meters, from voltage surges caused by a break in the circuit.

The object is to provide a means which may be more finely adjusted, which will be more positive in action and less expensive than devices now used for this purpose.

Other objects will be apparent from the detailed description of my invention.

The accompanying drawing illustrates a preferred embodiment of my invention. The watt-hour meter 6 is connected between a line 2 at about 1500 volts potential and ground 1. A conductor 3 from line 2 is secured to one terminal of the resistance 4, the other terminal being connected by a conductor 5 to the watt-hour meter, or similar recording meter, 6 which is in turn connected by a conductor 7 to ground.

As long as the circuit is closed the resistance 4 will serve to protect the meter from an excessively high voltage, the difference in potential between 5 and 7 being about 100 volts. However, meters of this nature sometimes get out of order and the circuit is broken. This causes the potential in conductor 5 to build up to the potential of the line (1500 volts). The meters used in these circuits have the external appearance of ordinary low voltage instruments and a man reading or repairing such a meter might unknowingly be subjected to the full 1500 volts.

To protect against this danger I have provided a bridge from conductor 5 to ground 1, including an electrolytic cell and a signal device. The conductor 8 is secured to the conductor 5 at 9 and is attached to a tantalum electrode 10 immersed in an acid electrolyte 11 held by a suitable acid-proof container 12. A lead electrode 13 is also immersed in this solution and is connected by a conductor 14 to a relay 15, thence by a conductor 16 to ground. The relay 15 is provided with a plunger 17 which closes a circuit through conductor 18 and a signal device 19 when current flows through the electrolytic cell.

The feature of this invention is the electrolytic cell used. The use of condensers, lightning arresters and circuit breakers in a safety device of this kind is well known. However, none of the prior devices performed with the desired precision. I have found that a tantalum electrolytic cell produces new and unexpected results in this connection. The film formed on the tantalum electrode effectively prevents any current from flowing up to a predetermined voltage. Other forms of electrolytic cells allow leakage current to flow which affects the accuracy of the meter readings. By varying the concentration of the sulphuric acid, the breakdown voltage of the tantalum film may be accurately regulated. When acid of 1.250 specific gravity is used, the film breaks down at about 125 volts. Should this voltage be exceeded, current will flow, actuating the relay 15 to energize the signal circuit 18. When the voltage drops below 125 the film on the tantalum electrode immediately reforms. I have produced an electrolytic cell that is more sensitive and more precise in operation than any cell heretofore known, due to the new and unexpected characteristics of the tantalum-sulphuric acid combination.

While I have described in detail a specific example of my invention, I do not intend to limit myself to the said details, except as defined by the following claim.

I claim:

In combination, a sensitive electrical meter, an electrolytic cell having a filmed tantalum electrode immersed in sulphuric acid, the film on said tantalum electrode having an infinitely large resistance to current at safe operating potentials of said sensitive meter and having a substantially negligible resistance to current at greater than the safe operating potentials of said sensitive meter, and electrical connections shunting said electrical cell across said sensitive meter for insuring the accuracy of said meter at the safe operating potentials thereof, whereby said sensitive meter is protected against greater than safe operating potentials.

In witness whereof, I hereunto subscribe my name this 21 day of February, 1927.

CLINTON E. STRYKER.